Figure 1:
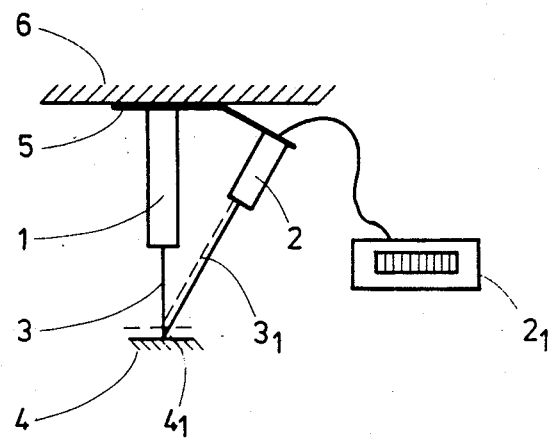

United States Patent [19]

Sciaky et al.

[11] Patent Number: 4,651,283

[45] Date of Patent: Mar. 17, 1987

[54] INSTALLATION FOR DETERMINING THE SPATIAL COORDINATES OF A POINT ON A PIECE, IN PARTICULAR FOR CONTROLLING A PLANT SUCH AS A WELDING PLANT FOR THE CAR BODIES OF MOTOR VEHICLES

[75] Inventors: Mario Sciaky, Paris; Roland Cazes, St Maur, both of France

[73] Assignee: Sciaky S.A., Vitry sur Seine, France

[21] Appl. No.: 649,027

[22] Filed: Sep. 10, 1984

[30] Foreign Application Priority Data

Sep. 8, 1983 [FR] France ................... 83 14324

[51] Int. Cl.$^4$ .................. G06F 15/46; B23K 27/00
[52] U.S. Cl. .................. 364/477; 219/121 LC; 219/121 LY; 364/167
[58] Field of Search ........ 364/477, 474, 475, 167–171; 219/121 L, 121 LC, 121 LD, 121 LS, 121 LT, 121 LU, 121 LX, 121 LY, 121 LZ, 121 LM

[56] References Cited

U.S. PATENT DOCUMENTS

| | | | |
|---|---|---|---|
| 3,902,036 | 8/1975 | Zaleckas ................... | 219/121 LS |
| 4,113,388 | 9/1978 | Gates et al. ............... | 356/110 |
| 4,209,252 | 6/1980 | Arditty et al. ............. | 356/4 |
| 4,237,275 | 4/1982 | Asaba et al. .............. | 219/121 LY X |
| 4,289,378 | 9/1981 | Remy et al. ............... | 219/121 LS X |
| 4,518,843 | 5/1985 | Antol et al. ................ | 219/121 LC |

FOREIGN PATENT DOCUMENTS 0087518  7/1983  European Pat. Off. .

*Primary Examiner*—Joseph Ruggiero
*Attorney, Agent, or Firm*—Seidel, Gonda, Goldhammer & Abbott

[57] ABSTRACT

An installation for determining the spatial coordinates of a point (P) on a piece (7) in particular for controlling a plant such as a welding plant for car bodies of motor vehicles. The installation is characterized in that it comprises a head (11) movable in a plane (X-Y) and produces a signal as a function of the distance of the point (P) in relation to the plane (X-Y), a rotor (13) on the head (11), this rotor comprising means for projecting a rotating laser beam ($21_4$), at least three fixed targets (Q, R, S) arranged in the plane (X-Y) and the coordinates of which in this plane are known, these targets being capable of producing a signal as a function of the position ($X_P$-$Y_P$) of the head (11) and hence of the point to be measured (P) in the plane (X-Y). The invention is applicable to an installation for determining the spatial coordinates of a point.

17 Claims, 3 Drawing Figures

INSTALLATION FOR DETERMINING THE SPATIAL COORDINATES OF A POINT ON A PIECE, IN PARTICULAR FOR CONTROLLING A PLANT SUCH AS A WELDING PLANT FOR THE CAR BODIES OF MOTOR VEHICLES

This invention relates to an installation for determining the spatial coordinates of a point on a piece, in particular for controlling a plant such as a welding plant for the car bodies of motor vehicles.

Installations for welding the parts of a car body comprise equipment designed to ensure correct relative positioning and fitting together of the parts of the body which are to be welded together. This positioning and fitting equipment comprises a plurality of support pieces having a profile which is the exact copy or counterpart of the corresponding part of the surface of the car body part which is to be assembled. Before the installation is put into operation, these support faces must be positioned very accurately on the supporting platform of the plant in relation to each other and in relation to the fitting and welding tools so that the parts to be welded will fit exactly on these surfaces so as to be correctly positioned and fitted together in order that the parts will be welded together in exactly the correct positions.

These preliminary adjustments are lengthy and delicate operations carried out manually by the empirical method of successively moving the parts closer to their correct positions, using specific structures adjusted to the moulds of the parts to be assembled, whereby the position of each of the support surfaces can be adjusted in relation to reference points.

It is also known to use sensing devices generally referred to as laser beam position detectors which are composed (see FIG. 1) of a laser beam generator 1 and a detector 2 which receives the laser beam 3 from a generator after reflection from the piece 4 whose distance from a reference surface is required to be measured.

The generator 1 and the detector 2 are mounted on a frame 5 which is fixed to a platform 6 constituting a reference surface so that the laser beam 3, which is perpendicular to the platform 6, strikes the piece 4 at the point $4_1$ which is to be measured. When the apparatus has been calibrated, the position of the reflected laser beam $3_1$ is a function of the distance of the point $4_1$ from the platform 6, that is to say from the reference surface. This position of the reflected laser beam $3_1$ is detected by the detector 2 which produces an information which is fed into a computer $2_1$. This computer then displays the distance of the point $4_1$.

Such a laser position detector is capable of providing very accurate measurement (to an accuracy of less than one hundredth of a millimeter) but its use for determining the spatial coordinates of a point of a welding plant for car bodies cannot be envisaged since it requires the use of a reference platform which is too bulky for use with a car body welding plant. Moreover, such an installation would require lengthy manipulation including successive fixing of the frame 5 to the platform opposite each point to be measured and it would also be necessary to determine, for each point to be measured, the exact coordinates of the location for fixing the position detector on the platform.

It is an object of the present invention to enable the spatial coordinates of a large number of points, in particular points on a welding plant for car bodies of motor vehicles, to be rapidly and accurately determined without the necessity of mechanically fixing the measuring apparatus separately for each point to be measured and therefore without the use of means for fixing the measuring apparatus, and moreover, without the need to determine for each measurement the coordinates of the point at which the apparatus is to be fixed.

The present invention has the further object of enabling a direct comparison to be made between coordinates of the points to be measured, determined by the installation, and coordinates of the corresponding theoretical point provided by the numerical expression of the form of the part or parts of car body to be positioned.

The installation according to the invention is characterised in that it comprises a head which is movable in a plane, a laser beam position detector on the head, which detector comprises means for projecting a laser beam to the point on the piece where the coordinates are to be measured, and a detector for receiving the laser beam reflected from the piece at the said point so as to produce a signal which is a function of the distance of the point from the plane, a rotor on the head, the axis of rotation of which rotor is perpendicular to the plane, said rotor comprising means for projecting a rotating laser beam, at least three fixed targets placed in the plane and the coordinates of which in this plane are known, these targets being capable of producing a signal which is a function of the position of the head and hence of the point to be measured in the plane, calculating means for receiving the information from the two detectors and determining the spatial coordinates of the point to be measured, and display means for displaying these coordinates.

According to another characteristic of the invention, the targets are passive targets and reflect the laser beam projected by the rotor of the head to a detector which is provided on the rotor and produce a signal which is a function of the position of the head.

According to another characteristic of the invention, the axis of rotation of the rotor of the head coincides with the axis of the incident laser beam produced by the position detector of this head.

According to another characteristic of the invention, the head is capable of translation in the plane by pivoting on an arm which in turn pivots on a fixed pedestal.

Figure 3:
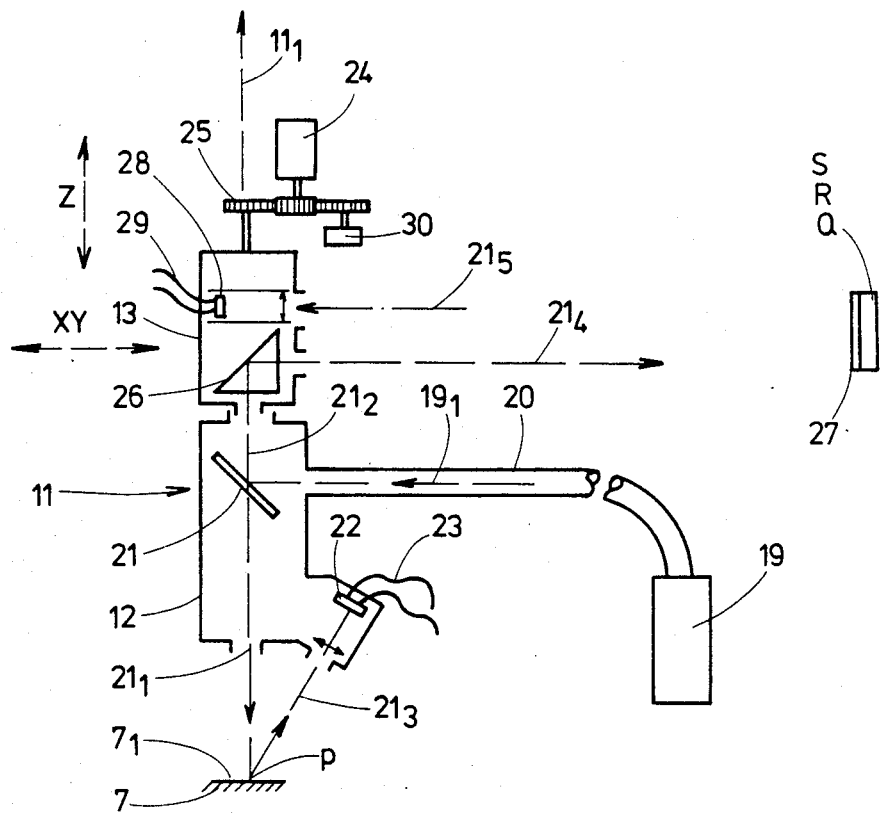
Figure 2:
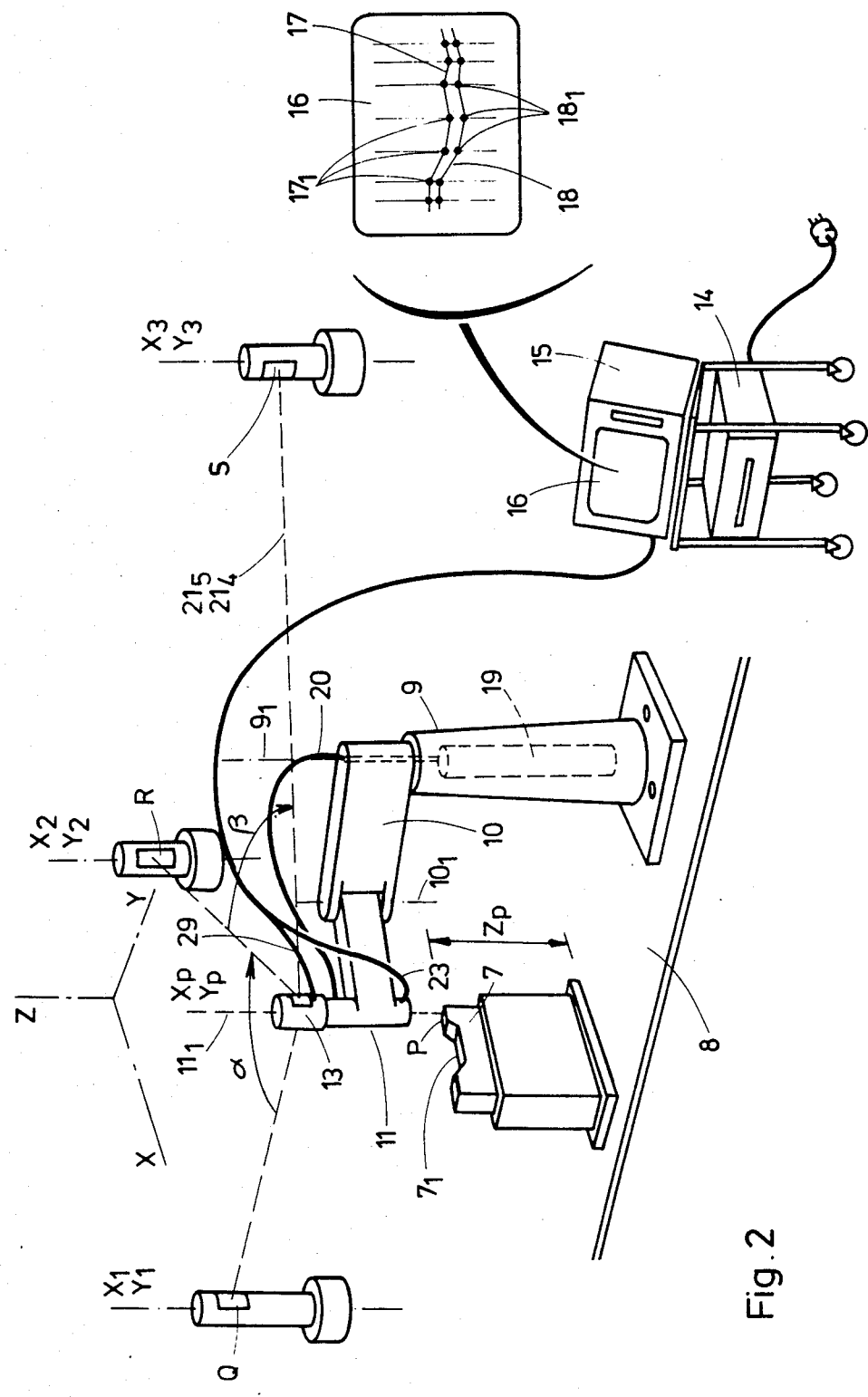

The invention is illustrated by way of non-limiting example in the attached drawings, in which FIG. 1 is a schematic side view of a laser beam position detector of known type, FIG. 2 is a perspective view of one embodiment of the whole installation according to the invention, FIG. 3 is a vertical axial section through the measuring head of the installation of FIG. 2.

According to FIG. 2, the installation is provided to control a welding plant for the car bodies of motor vehicles, only a single support piece 7 of the installation being shown for the sake of simplicity of the drawing. The welding apparatus and fitting devices, which are known per se, have also been omitted from the drawing for the sake of clarity.

The support piece 7 has a surface $7_1$ corresponding in form to a surface element of one of the car body parts which are to be welded. This piece 7 must be positioned on the supporting table 8 so that each point on the surface $7_1$ occupies a predetermined position in space in relation to the other pieces 7 and so that the car body parts will be correctly fitted on all these pieces.

A vertical pedestal 9 fixed to the horizontal table 8 carries at its upper end an arm 10 which pivots in a horizontal plane on a vertical axis $9_1$. This arm 10 carries a measuring head 11 pivoting on a vertical axis $10_1$ and therefore displaceable in a horizontal plane X-Y so that it can be rapidly moved by translation to the positions of vertical alignment with the various points to be measured on the support pieces, such as the point P of the piece 7.

This installation also comprises targets Q, R, S mounted on the table 8 to be situated in the plane X-Y so that the coordinates $X_1$, $Y_1$, $X_2$, $Y_2$ and $X_3$, $Y_3$ of these targets taken as reference points on the table 8 are known.

These targets are placed at some distance from the pieces 7 and from the whole plant provided for positioning, fitting and welding of the parts so that they will not interfere with correct positioning and subsequent operation of the plant.

The measuring head 11 comprises a lower housing 12 for a laser beam position detector provided for determining, after calibration, the distance $Z_p$ of the point to be measured P from the table 8 or any other reference surface. Above this housing 12 is a rotor 13 cooperating with the targets Q, R, S to determine, by triangulation, the coordinates $X_p$, $Y_p$ of the axis $11_1$ of the head 11, these coordinates also being those of the point P in this plane.

The coordinates $X_p$, $Y_p$ and $Z_p$ thus determine the spatial position of the point P and are compared by a computer 14 with the theoretical coordinates of the same point stored in a memory so that a visual display device 15 can record on its screen 16 the difference between the measured coordinates and the theoretical coordinates stored in the memory of the computer. These theoretical coordinates are preferably established by the numerical expression of the form of the part or parts of the car body to be treated.

This control may be carried out by visually displaying on the screen 16 various points $17_1$ each corresponding to the measured value $Z_p$ of a measured point P having the coordinates $X_p$, $Y_p$, $Z_p$. A graph 17 can thus be obtained by extrapolation, and by comparing the position of this graph 17 with a theoretical graph 18 obtained from theoretical corrdinates stored in the memory, giving the theoretical value for $Z_t$, the values for Z may be obtained for various points $18_1$ having the coordinates $X_t$, $Y_t$ and $Z_t$.

The operator may then check the correct positioning of the piece 7 by confirming the coincidence of the graph 17 and 18 or, if they do not coincide, he can correct the position of the piece 7 on the table 8 until this coincidence is obtained. These systems may also be used to obtained the numerical values of the differences between the real positions measured and the theoretical positions.

The measuring head 11 is supplied with a laser beam $19_1$ from a laser beam generator 19 situated in the pedestal 9. This laser beam is transmitted to the head 11 by a fibre optical cable 20.

Inside the housing 12, the laser beam $19_1$ first strikes a separator 21 known per se, consisting, for example, of a semi-transparent mirror and an arrangement of lenses and prisms.

This separator 21, arranged on the axis $11_1$, produces two coaxial laser beams $21_1$ and $21_2$ which emerge on opposite sides to be transmitted along the axis $11_1$ of the head 11 in a direction parallel to the direction Z, that is to say perpendicular to the plane XY.

The beam $21_1$ is used in a laser beam position detector to determine the distance $Z_p$ after calibration of the apparatus.

To determine this distance, the beam $21_1$ strikes the surface $7_1$ of the piece 7 at the point P and is reflected at $21_3$ to the detector 22 from which the information received, which is a function of $Z_p$, is transmitted to the computer 14 and visual display device 15.

The rotor 13 is mounted to rotate on the housing 12 about an axis coinciding with the axis $11_1$ of the head 11 and is driven for this purpose by the motor 24 by way of the gear wheel assembly 25.

This rotor 13 has a mirror 26 or the like producing from the laser beam $21_2$ a beam $21_4$ which lies in the plane X-Y and is rotated in this plane by the rotation of the rotor 13.

In the course of rotation of the rotor 13, the laser beam $21_4$ successively strikes and is reflected from the reflective surfaces 27 of the targets Q, R, S. These reflective surfaces are formed by cylindrical mirrors having their axes extending in the direction Z.

Whatever the position of the head 11, the laser beam $21_4$ is reflected by the mirrors 27 as a beam $21_5$ which is received by a detector 28 in the head 13 and oriented parallel to the beam $21_4$.

The coordinates $X_p$, $Y_p$ of point P are measured by triangulation, using goniometric type measurements. These coordinates are determined by the values of the angles $\alpha$ and $\beta$, the apex of which is formed by the axis $11_1$ of the head 11 passing through the point P, and the sides of which are defined by the laser beams $21_4$ and $21_5$ striking against and reflected from the targets X, R and R, S.

Measurement of these angles is obtained by counting the number of pulses which rotation of the head produces on a generator 30 mechanically linked to this rotation, each angular value of rotation corresponding to a predetermined number of pulses so that the measurement can be obtained with the desired precision. For each angle $\alpha$ and $\beta$, the pulse count commences and finishes with the passage of the laser beam over one of the targets Q, R, S, this passage being recorded when the echo of the said beam is received by the opto-electronic element 29.

The numbers of pulses $N_\alpha$ and $N_\beta$ recorded by the system is translated by the computer into coordinates $X_p$ and $Y_p$ of the axis of the system, using the previously known coordinate couples $X_1$, $Y_1$; $X_2$, $Y_2$ and $X_3$, $Y_3$ of the targets.

It is to be understood that correct functioning of the installation according to the invention can only be obtained after calibration, that is to say after precise determination of the coordinates $X_1$, $Y_1$; $X_2$, $Y_2$ and $X_3$, $Y_3$ of the targets Q, R, S in relation to a reference and preferably in relation to the table 8 and after the position of the head 11 has been determined in relation to this same reference 8 in the direction Z.

After these adjustments, all that is required is to displace the head 11 in the plane X-Y by pivoting this head on the arm 10 and pivoting the arm 10 on the pedestal 9 so that the head 11 is successively placed in vertical alignment with the various points to be measured on all the pieces 7.

For the sake of simplifying the present description, it has been indicated that the mirror 26 produces a beam $21_4$ which rotates in the plane X-Y containing the targets Q, R, S which reflect the laser beam to the detector 28 of the rotor. It should be understood, however, that in practice the mirror 26 and detector 28 could be situated outside the plane containing the targets Q, R, S, in which case the mirror, targets and detector are inclined so that the rotating laser beam $21_4$ reflected by the mirror strikes these targets to be returned to the detector 28.

Similarly, in the present description the targets Q, R, S are passive reflectors and the passage of the beam over them produces an echo which is picked up by the opto-electronic element 29.

In a second version of the same apparatus, the tarets Q, R and S are active and each is equipped with an opto-electronic component similar to 28 and directly providing the beam passage pulses for the commencement or finishing of the angular counting.

In another version of the same apparatus, the targets Q, R and S are also active and at the time of passage of the beam they provide not only the beam passage pulses but also an information in analogue or numerical form relating to the height of each target in relation to a reference level connected to the target support, this height being that at which the beam acts on a given target. In this case, the system is able to recognise, for each couple X, Y known in advance, the coordinates Z.

The reference for the measurements is then not formed by the plane of the upper surface of the table 8 but by a plane defined by the three points $X_1, Y_1, Z_1$; $X_2, Y_2, Z_2$; $X_3, Y_3, Z_3$ connected to the device and not to the plant.

We claim:

1. Installation for determining the spatial coordinates of a point (P) on a piece (7), in particular for controlling a plant such as a welding plant for the car bodies of motor vehicles, which installation is characterised in that it comprises a head (11) displaceable in a plane (X-Y), a laser beam position detector on the head, which position detector comprises means (21) for projecting a laser beam ($21_1$) to the point (P) of the piece (7) of which the coordinates are required to be measured and a detector (22) for receiving the laser beam ($21_3$) reflected from the piece (7) at the point (P) in order to produce a signal which is a function of the distance of the point (P) from the plane (X-Y), a rotor (13) on the head (11), the axis of rotation ($11_1$) of this rotor being perpendicular to the plane (X-Y), this rotor comprising means (26) for projecting a rotating laser beam ($21_4$), at least three fixed targets (Q, R, S) placed in the plane (X-Y) and the coordinates of which in this plane are known, these tarets being capable of producing a signal as a function of the position ($X_p, Y_p$) of the head (11) and hence of the point to be measured (P) in the plane (X-Y), calculating means for receiving the two signals (23,28) and determining the spatial coordinates ($X_p, Y_p$ and $Z_p$) of the point to be measured (P), and display means (15) for displaying these coordinates.

2. Installation according to claim 1 characterised in that the targets (Q, R, S) are passive targets and reflect the lasert beam ($21_4$) projected by the rotor (13) of the head to a detector (28) provided on the rotor and produce a signal as a function of the position ($X_p, Y_p$) of the head.

3. Installation according to claim 1, characterised in that the axis of rotation of the rotor (13) of the head coincides with the axis ($11_1$) of the incident laser beam ($21_1$) produced by the position detector (12, 21, 22) of this head.

4. Installation according to claim 1 characterized in that the head (11) is displaceable by translation in the plane (X-Y) by pivoting on an arm (10) which in turn pivots on a fixed pedestal (9).

5. Installation according to claim 2 characterized in that the head (11) is displaceable by translation in the plane (X-Y) by pivoting on an arm (10) which in turn pivots on a fixed pedestal (9).

6. Installation according to claim 3 characterized in that the head (11) is displaceable by translation in the plane (X-Y) by pivoting on an arm (10) which in turn pivots on a fixed pedestal (9).

7. Installation according to claim 1 characterized in that the means (21) of the position detector projecting a laser beam ($21_1$) along the axis ($11_1$) perpendicular to the plane (X-Y) consists of a laser beam divider receiving the incident laser beam ($19_1$) from a laser beam generator (19) and producing two coaxial laser beams ($21_1$ and $21_2$) in opposite directions, one ($21_1$) of these beams being directed to the point (P) of the piece (7) to be reflected to the detector means (22) of the position detector, while the other ($21_2$) of these beams is directed to the means (26) of the rotor producing the rotating laser beam ($21_4$).

8. Installation according to claim 2 characterized in that the means (21) of the position detector projecting a laser beam ($21_1$) along the axis ($11_1$) perpendicular to the plane (X-Y) consists of a laser beam divider receiving the incident laser beam ($19_1$) from a laser beam generator (19) and producing two coaxial laser beams ($21_1$ and $21_2$) in opposite directions, one ($21_1$) of these beams being directed to the point (P) of the piece (7) to be reflected to the detector means (22) of the position detector, while the other ($21_2$) of these beams is directed to the means (26) of the rotor producing the rotating laser beam ($21_4$).

9. Installation according to claim 3 characterized in that the means (21) of the position detector projecting a laser beam ($21_1$) along the axis ($11_1$) perpendicular to the plane (X-Y) consists of a laser beam divider receiving the incident laser beam ($19_1$) from a laser beam generator (19) and producing two coaxial laser beams ($21_1$ and $21_2$) in opposite directions, one ($21_1$) of these beams being directed to the point (P) of the piece (7) to be reflected to the detector means (22) of the position detector, while the other ($21_2$) of these beams is directed to the means (26) of the rotor producing the rotating laser beam ($21_4$).

10. Installation according to claim 4 characterized in that the means (21) of the position detector projecting the laser beam ($21_1$) along the axis ($11_1$) perpendicular to the plane (X-Y) consists of a laser beam divider receiving the incident laser beam ($19_1$) from a laser beam generator (19) and producing two coaxial laser beams ($21_1$ and $21_2$) in opposite directions, one ($21_1$) of these beams being directed to the point (P) of the piece (7) to be reflected to the detector means (22) of the position detector, while the other ($21_2$) of these beams is directed to the means (26) of the rotor producing the rotating laser beam ($21_4$).

11. Installation according to claim 1 characterized in that a sequencer (30) is driven synchronously with the rotor (13), the pulses produced by this sequencer being transmitted to the laser beam generator (19) to produce a pulsed laser beam ($19_1$) the pulses of which are the function of the angular position of the rotor, the pulses of the laser beam ($21_1$) reflect to the detector (28) of the rotor by the targets (Q, R, S) determining an information of the position of the head (11) from the value of the angles of which the apex is formed by the axis (11₁) of the head and which pass over the targets (Q, R, S).

12. Installation according to claim 2 characterized in that a sequencer (30) is driven synchronously with the rotor (13), the pulses produced by this sequencer being transmitted to the laser beam generator (19) to produce a pulsed laser beam (19₁) the pulses of which are the function of the angular position of the rotor, the pulses of the laser beam (21₁) reflect to the detector (28) of the rotor by the targets (Q, R, S) determining an information of the position of the head (11) from the value of the angles of which the apex is formed by the axis (11₁) of the head and which pass over the targets (Q, R, S).

13. Installation according to claim 3 characterized in that a sequencer (30) is driven synchronously with the rotor (13), the pulses produced by this sequencer being transmitted to the laser beam generator (19) to produce a pulsed laser beam (19₁) the pulses of which are the function of the angular position of the rotor, the pulses of the laser beam (21₁) reflect to the detector (28) of the rotor by the targets (Q, R, S) determining an information of the position of the head (11) from the value of the angles of which the apex is formed by the axis (11₁) of the head and which pass over the targets (Q, R, S).

14. Installation according to claim 4 characterized in that a sequencer (30) is driven synchronously with the rotor (13), the pulses produced by this sequencer being transmitted to a laser beam generator (19) to produce a pulsed laser beam (19₁) the pulses of which are the function of the angular position of the rotor, the pulses of the laser beam (21₁) reflect to the detector (28) of the rotor targets (Q, R, S) determining an information of the position of the head (11) from the value of the angles of which the apex is formed by the axis (11₁) of the head and which pass over the targets (Q, R, S).

15. Installation according to claim 10 characterized in that a sequencer (30) is driven synchronously with the rotor (13), the pulses produced by this sequencer being transmitted to the laser beam generator (19) to produce a pulsed laser beam (19₁) the pulses of which are the function of the angular position of the rotor, the pulses of the laser beam (21₁) reflect to the detector (28) of the rotor by the targets (Q, R, S) determining an information of the position of the head (11) from the value of the angles of which the apex is formed by the axis (11₁) of the head and which pass over the targets (Q, R, S).

16. Installation according to claim 1 characterized in that a computer compares the coordinates ($X_p$, $Y_p$ and $Z_p$) obtained from the detectors (22, 28) of the movable head with the memorized numerical information of the form of the part or parts of the car body to be assembled.

17. Installation according to claim 2 characterized in that a computer compares the coordinates ($X_p$, $Y_p$ and $Z_p$) obtained from the detectors (22, 28) of the movable head with the memorized numerical information of the form of the part or parts of the car body to be assembled.

* * * * *